United States Patent
Brannon et al.

(10) Patent No.: US 12,457,242 B2
(45) Date of Patent: Oct. 28, 2025

(54) SYSTEMS AND METHODS FOR AUTOMATICALLY BLOCKING THE USE OF TRACKING TOOLS

(71) Applicant: OneTrust, LLC, Atlanta, GA (US)

(72) Inventors: Jonathan Blake Brannon, Smyrna, GA (US); Patrick Whitney, Atlanta, GA (US); Sharath Chandra Chavva, Atlanta, GA (US); Jeffrey Baucom, Sandy Springs, GA (US)

(73) Assignee: OneTrust, LLC, Atlanta, GA (US)

( * ) Notice: Subject to any disclaimer, the term of this patent is extended or adjusted under 35 U.S.C. 154(b) by 76 days.

(21) Appl. No.: 18/586,958

(22) Filed: Feb. 26, 2024

(65) Prior Publication Data

US 2024/0195835 A1    Jun. 13, 2024

Related U.S. Application Data

(63) Continuation of application No. 17/942,242, filed on Sep. 12, 2022, now Pat. No. 11,968,229, which is a continuation of application No. 17/387,421, filed on Jul. 28, 2021, now Pat. No. 11,444,976.

(60) Provisional application No. 63/057,382, filed on Jul. 28, 2020.

(51) Int. Cl.
*H04L 9/40* (2022.01)
(52) U.S. Cl.
CPC ...... *H04L 63/1475* (2013.01); *H04L 63/1416* (2013.01)

(58) Field of Classification Search
USPC .......................................................... 726/23
See application file for complete search history.

(56) References Cited

U.S. PATENT DOCUMENTS

| | | | |
|---|---|---|---|
| 9,558,677 B2 * | 1/2017 | Sadeh-Koniecpol | G09B 19/00 |
| 2016/0006760 A1 * | 1/2016 | Lala | G06F 21/51 |
| | | | 726/23 |
| 2016/0080405 A1 * | 3/2016 | Schler | H04L 63/1408 |
| | | | 726/23 |
| 2016/0253497 A1 * | 9/2016 | Christodorescu | G06F 21/566 |
| | | | 726/23 |
| 2017/0093917 A1 * | 3/2017 | Chandra | H04L 63/20 |
| 2019/0141063 A1 * | 5/2019 | Hamdi | H04L 67/30 |
| 2019/0354709 A1 * | 11/2019 | Brinskelle | G06F 21/31 |
| 2020/0067979 A1 * | 2/2020 | Wright | H04L 63/168 |

(Continued)

Primary Examiner — Sakinah White Taylor
(74) Attorney, Agent, or Firm — Ballard Spahr LLP

(57) ABSTRACT

Embodiments of the present invention provide methods, apparatus, systems, computing devices, computing entities, and/or the like for permitting or blocking tracking tools used through webpages. In particular embodiments, the method involves: scanning a webpage to identify a tracking tool configured for processing personal data; determining a data destination location that is associated with the tracking tool; and generating program code configured to: determine a location associated with a user who is associated with a rendering of the webpage; determine a prohibited data destination location based on the location associated with the user; determine that the data destination location associated with the tracking tool is not the prohibited data destination location; and responsive to the data destination location associated with the tracking tool not being the prohibited data destination location, permit the tracking tool to execute.

20 Claims, 6 Drawing Sheets

(56) References Cited

U.S. PATENT DOCUMENTS

| | | | |
|---|---|---|---|
| 2021/0075826 A1* | 3/2021 | Johnson | H04L 67/02 |
| 2021/0099483 A1* | 4/2021 | Shukla | G06F 21/566 |
| 2021/0357542 A1* | 11/2021 | Bowen | G06Q 30/0621 |
| 2022/0075845 A1* | 3/2022 | Bowen | G06F 30/30 |

* cited by examiner

SYSTEMS AND METHODS FOR AUTOMATICALLY BLOCKING THE USE OF TRACKING TOOLS

CROSS-REFERENCE TO RELATED APPLICATIONS

This application is a continuation of U.S. patent application Ser. No. 17/942,242, filed Sep. 12, 2022, which is a continuation of U.S. patent application Ser. No. 17/387,421, filed Jul. 28, 2021, now U.S. Pat. No. 11,444,976, issued Sep. 13, 2022, which claims the benefit of U.S. Provisional Patent Application No. 63/057,382, filed Jul. 28, 2020, the disclosures of which are hereby incorporated herein by reference in their entirety.

TECHNICAL FIELD

The present disclosure is generally related to a computational framework used for blocking tracking tools used through webpages.

BACKGROUND

Tracking tools are often used on websites to track users and/or the users' behaviors as they use respective browsers to visit the websites. For example, cookies may be used to track a user's interests, location, age, and/or search trends. A technical challenge often encountered by many entities (e.g., e-commerce business) operating websites is controlling such use based on the visitors to the websites. Accordingly, there is currently a need for improved tools for automatically blocking of tracking technologies associated with a website, such as tracking technologies that process personal data in one or more categories for which a relevant user has not provided consent, as well as improved tools for automatically blocking tracking technologies that transfer personal data to jurisdictions where such transfers are prohibited by applicable laws and/or regulations.

SUMMARY

In accordance with various aspects, a method is provided that comprises: scanning, by computing hardware, a webpage to identify a tracking tool that is associated with the webpage; determining, by the computing hardware, a data destination location that is associated with the tracking tool, wherein the determining step is based on at least one of (a) a location for a computing device that invokes the tracking tool, (b) a location of a computing device that receives data via the tracking tool, or (c) a location of a computing device or a storage device that stores the data; and generating, by the computing hardware, program code, wherein the program code is configured to: determine a location associated with a user who is associated with a rendering of the webpage; determine a prohibited data destination location based on a data structure mapping the location associated with the user to the prohibited data destination location; determine that the data destination location associated with the tracking tool is the prohibited data destination location; and responsive to determining that the data destination location associated with the tracking tool is the prohibited data destination location, perform at least one of disabling the tracking tool from executing or disabling functionality of the tracking tool configured for processing the data from executing.

In some aspects, the program code is further configured to: determine a second location associated with a second user who is associated with a second rendering of the webpage; determine a second prohibited data destination location based on the data structure mapping the second location associated with the user to the second prohibited data destination location; determine that the data destination location associated with the tracking tool is not the second prohibited data destination location; and responsive to determining that the data destination location associated with the tracking tool is not the second prohibited data destination location, permit the tracking tool to execute.

In some aspects, the method further comprises generating, by the computing hardware, a computer-readable file comprising an identifier for the tracking tool and an identifier for the data destination location associated with the tracking tool, wherein the program code comprises the computer-readable file and is configured to identify the data destination location associated with the tracking tool from the computer-readable file. In some aspects, the computer-readable file further comprises the data structure. In some aspects, the program code is configured, prior to determining the location associated with the user, to determine that the tracking tool is authorized to run from the computer-readable file.

In some aspects, the program code is configured, prior to determining the location associated with the user, to determine that the user has provided consent for the tracking tool. In some aspects, the program code is configured, prior to determining the location associated with the user to: determine that the user has not provided consent for the tracking tool; and responsive to determining the user has not provided the consent for the tracking tool, obtain the consent from the user.

In accordance with various aspects, a method is provided that comprises: receiving, by computing hardware, a Hypertext Transfer Protocol (HTTP) request to render a webpage; and responsive to receiving the HTTP request, sending, by the computing hardware, a HTTP response comprising a script to a computing device associated with a user, wherein the computing device is configured to execute, within a browser and during a rendering of the webpage, the script to perform operations comprising: identifying a source script attempting to execute; identifying the source script is configured to invoke a tracking tool based on information on the tracking tool found embedded in the script; and responsive to identifying the source script is configured to invoke the tracking tool: determining a location associated with the user; determining a prohibited data destination location based on a data structure mapping the location associated with the user to the prohibited data destination location; determining a data destination location associated with the tracking tool based on the information embedded in the script; determining that the data destination location associated with the tracking tool is the prohibited data destination location; and responsive to determining that the data destination location associated with the tracking tool is the prohibited data destination location, perform at least one of disabling the tracking tool from executing or disabling functionality of the tracking tool involving processing certain data from executing. In some aspects, the script further performs operations comprising, after disabling the functionality, permitting the source script to execute to invoke the tracking tool for the webpage.

In some aspects, the method further comprises: receiving, by the computing hardware, a second Hypertext Transfer Protocol (HTTP) request to render the webpage; and responsive to receiving the second HTTP request, sending, by the computing hardware, a second HTTP response comprising the script to a second computing device associated with a second user, wherein the second computing device is configured to execute, within a second browser and during a second rendering of the webpage, the script to perform operations comprising: identifying the source script attempting to execute; identifying the source script is configured to invoke the tracking tool based on the information on the tracking tool found embedded in the script; and responsive to identifying the source script is configured to invoke the tracking tool: determining a second location associated with the second user; determining a second prohibited data destination location based on the data structure mapping the second location associated with the second user to the second prohibited data destination location; determining the data destination location associated with the tracking tool based on the information embedded in the script; determining that the data destination location associated with the tracking tool is not the second prohibited data destination location; and responsive to determining that the data destination location associated with the tracking tool is not the second prohibited data destination location, permitting the tracking tool to execute for the webpage. In some aspects, permitting the tracking tool to execute for the webpage comprises permitting the source script to execute to invoke the tracking tool.

In some aspects, the script is configured to determine the location associated with the user based on at least one of (a) a geographical location of the user, (b) a network address associated with the user, (c) browser information on the user, (d) a language associated with the user, or (e) consent data associated with the user. In some aspects, the data destination location associated with the tracking tool is based on at least one of (a) a location for a computing device that invokes the tracking tool, (b) a location of a computing device that receives the data, or (c) a location of a computing device or a storage device that stores the data.

In accordance with various aspects, a non-transitory computer-readable medium storing computer-executable instructions is provided. Accordingly, the computer-executable instructions, when executed by one or more processing devices, configure the one or more processing devices to perform operations that comprise: scanning a webpage to identify a tracking tool that is associated with the webpage; determining a data destination location that is associated with the tracking tool, wherein the determining step is based on at least one of (a) a location for a computing device that invokes the tracking tool, (b) a location of a computing device that receives data via the tracking tool, or (c) a location of a computing device or a storage device that stores the data; and generating program code, wherein the program code is configured to: determine a location associated with a user who is associated with a rendering of the webpage; determine a prohibited data destination location based on a data structure mapping the location associated with the user to the prohibited data destination location; determine that the data destination location associated with the tracking tool is the prohibited data destination location; and responsive to determining that the data destination location associated with the tracking tool is the prohibited data destination location, perform at least one of disabling the tracking tool from executing or disabling functionality of the tracking tool configured for processing the data from executing.

In some aspects, the program code is further configured to: determine a second location associated with a second user who is associated with a second rendering of the webpage; determine a second prohibited data destination location based on the data structure mapping the second location associated with the user to the second prohibited data destination location; determine that the data destination location associated with the tracking tool is not the second prohibited data destination location; and responsive to determining that the data destination location associated with the tracking tool is not the second prohibited data destination location, permit the tracking tool to execute.

In some aspects, the operations further comprise generating a computer-readable file comprising an identifier for the tracking tool and an identifier for the data destination location associated with the tracking tool, wherein the program code comprises the computer-readable file and is configured to identify the data destination location associated with the tracking tool from the computer-readable file. In some aspects, the computer-readable file further comprises the data structure. In some aspects, the program code is configured, prior to determining the location associated with the user, to determine that the tracking tool is authorized to run from the computer-readable file.

In some aspects, the program code is configured, prior to determining the location associated with the user, to determine that the user has provided consent for the tracking tool. In some aspects, the program code is configured, prior to determining the location associated with the user to: determine that the user has not provided consent for the tracking tool; and responsive to determining the user has not provided the consent for the tracking tool, obtain the consent from the user.

BRIEF DESCRIPTION OF THE DRAWINGS

In the course of this description, reference will be made to the accompanying drawings, which are not necessarily drawn to scale, and wherein.

DETAILED DESCRIPTION

Figure 1:
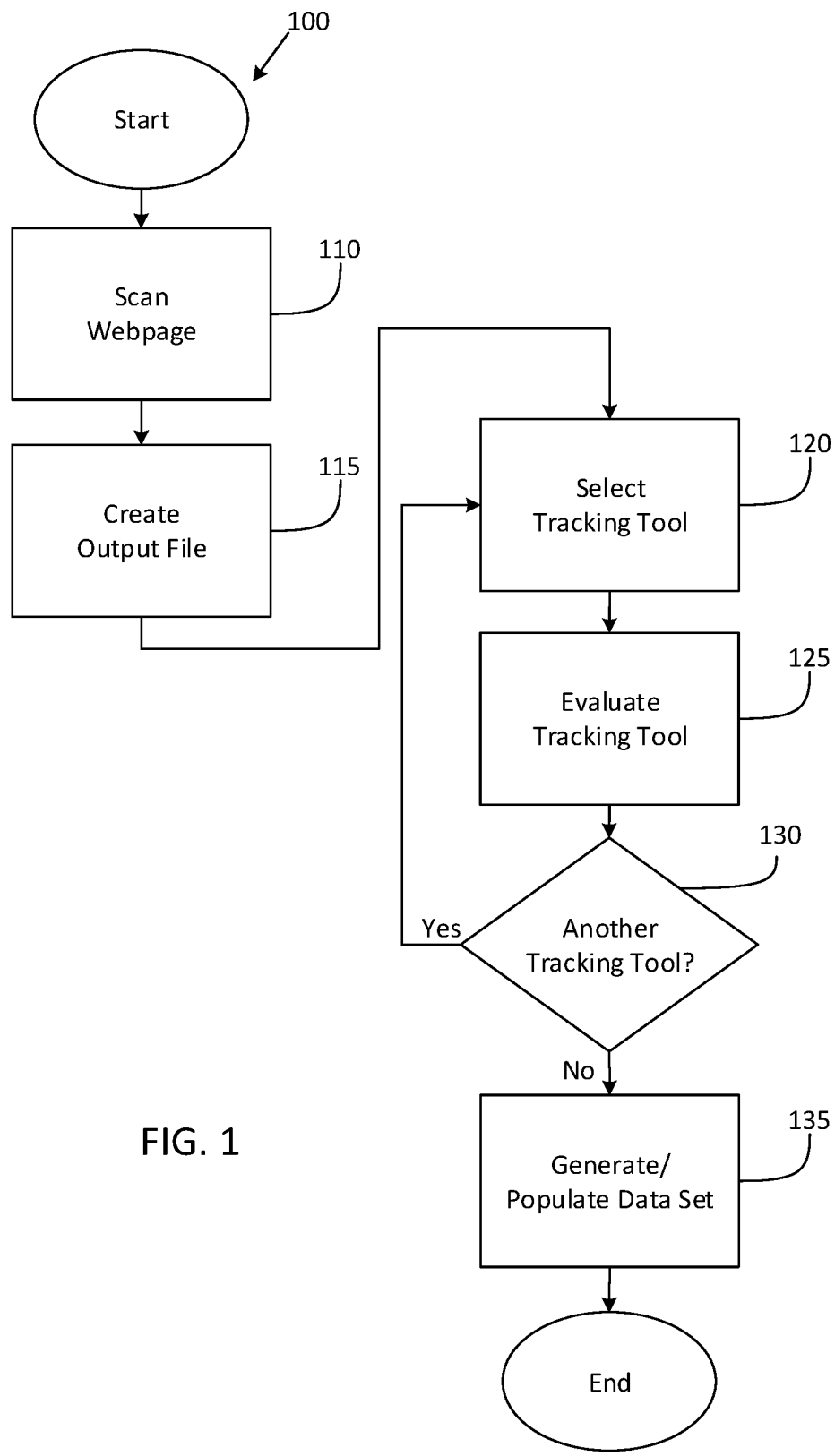
FIG. 1 is a flowchart of a process for identifying one or more tracking tools associated with a webpage in accordance with various embodiments of the present disclosure.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Technical Contributions of Various Embodiments

Tracking tools are often used on websites to track users and/or the users' behaviors as they are using respective browsers to visit the websites. For example, cookies may be used to track a user's interests, location, age, and/or search trends. A technical challenge often encountered by many entities (e.g., e-commerce business) operating websites is controlling such use based on the visitors to the websites. Normally a tracking tool is loaded via a script during the rendering of a webpage of the website upon a visitor requesting to view the webpage. Under a conventional setting, the script executes in the same manner regardless of the visitor to the site. That is to say, the script loads the tracking tool regardless of the visitor.

This may be true even in instances in which a visitor to a website may first need to provide consent before a tracking tool is used to track the visitor and/or visitor's behavior. For example, the visitor may be requested to consent to having his or her behavior tracked and, upon consent, the tracking tool may be loaded to begin tracking the visitor's behavior. However, in situations where the visitor has provided consent, the tracking tool may be loaded without regard to or consideration of the particular visitor who has provided the consent. However, there may be instances in which use of the tracking tool should still be avoided. This is because even though the visitor has provided consent, restrictions may still apply to the use of the tracking tool.

For example, if an entity plans on transferring European Union (EU) personal data outside the EU, then the entity can only transfer such data to countries with robust data protection regulations. As a result, an entity (e.g., e-commerce business) that is operating a website with users from the EU and that is collecting any of the users' personal data such as email address, cookies analytics data, and/or the like falls under such restrictions. Such restrictions are generally in place regardless of whether or not the users have provided consent to having their personal data collected. Therefore, an entity that is operating a website and that collects personal data through the use of a tracking tool may want to avoid collecting personal data from EU customers who visit the website, even in instances in which the customer has provided consent to having his or her personal data collected. However, regulating the use of tracking tools for such situations can be a challenge under a conventional setting.

Various embodiments of the disclosure address several of the technical challenges associated with using tracking tools that process (e.g., collect, store, transfer, and/or the like) personal data by providing a tracking tool blocking framework configured to dynamically detect one or more tracking tools (e.g., scripts, cookies, web beacons, and/or the like) associated with one or more webpages of websites so that particular tools (and/or various capabilities and/or functionality thereof) can be automatically blocked in response to determining that the particular tools result in a transfer of personal data to and/or from a prohibited location (e.g., jurisdiction such as a country, state, region, and/or the like). For instance, in particular embodiments, the framework can be used to automatically block one or more tracking tools associated with a webpage for a website that transfers any personal data associated with a particular user who is visiting the website from a location other than a location in which the particular user resides. In addition, in particular embodiments, the framework can be configured to limit the capabilities of one or more tracking tools so that, rather than entirely blocking such tools, the framework allows such tools to execute but prevents the tools from processing personal data in association with prohibited locations (e.g., jurisdictions).

Accordingly, various embodiments of the disclosure provided herein address many of the technical disadvantages encountered in using tracking tools that process personal data involving parties who are subject to jurisdictions that place restrictions on the use and transfer of personal data. Specifically, embodiments of the disclosure provide a novel framework that can be implemented for various websites and configured to evaluate tracking tools used in conjunction with webpages as the webpages are being loaded so that the tracking tools can be disabled and/or so that capabilities/functionality of the tracking tools can be disabled if determined to involve the use of personal data in a restricted/prohibited location (e.g., jurisdiction). As a result, embodiments of the disclosure can increase security, reliability, capacity, and efficiency in using tracking tools in conjunction with webpages and personal data. In doing so, various embodiments of the present disclosure make major technical contributions to improving the use of tracking tools that involve the processing of personal data along with websites. This in turn translates to more computationally reliable, secure, and/or efficient systems that process personal data.

For purposes of this disclosure, "tracking tools" may refer to, for example, cookies, beacons (e.g., visible elements such as graphics, banners, or buttons; non-pictorial HTML elements such as the frame, style, script, input link, embed, object, etc. of the web page), scripts, image files, tags, tracking code, and/or any other tracking tools or technology. A geographic area may be referred to as a jurisdiction. Accordingly, a "jurisdiction" as used herein may refer to, for example, a country, region, group of countries, legal jurisdiction, federation of countries, and/or any other area to which a set of laws and/or regulations may apply. Furthermore, although the remainder of the disclosure makes reference to the use of various embodiments of the disclosure in conjunction with tracking tools used for processing (e.g., collecting, storing, transferring, and/or the like) personal data, those of ordinary skill in the art will recognize that embodiments of the disclosure can be used in conjunction with tracking tools used for processing other types of data such as, for example, confidential data associated with an entity such as an organization, charity, government, and/or the like.

Tracking Tool Identification

Turning now to FIG. 1, additional details are provided regarding a process 100 for identifying one or more tracking tools associated with a webpage of a website in accordance with various embodiments of the disclosure. Accordingly, the process 100 may be implemented in various embodiments as suitable program code executed on computing hardware such as, for example, a server as described herein.

Depending on the circumstances, the tracking tool identification process 100 may be performed to identify and categorize the tracking tools related to one or more webpages for a website prior to a user visiting the website or at a time when a user is actively visiting the website. For instance, in particular embodiments, the tracking tool identification process 100 may be performed at a time when new content has been added to one or more webpages and as a result, a new tracking tool may have been added to one or more of the webpages. For example, a new code release may have been issued for the website and/or a tag manager used for the website may have been updated. In other instances, the tracking tool identification process 100 may be performed to identify and categorize the tracking tools for one or more webpages of a website "on the fly" at a time when a user is visiting the website and the one or more webpages are being rendered. Such a configuration can ensure that any tracking tool that has been newly added is identified and categorized.

Accordingly, the tracking tool identification process 100 begins with performing a scan of a webpage to identify any tracking tools associated with the webpage and/or any respective scripts that may be used to execute, load, introduce, and/or the like the tracking tools at Step 110. For example, in various embodiments, the tracking tool identification process 100 may involve using a scanner such as Chrome scanner to scan the webpage as it is being loaded to identify the tracking tools and/or associated scripts.

For instance, in particular embodiments, the tracking tool identification process 100 may involve identifying a source for a particular tracking tool by analyzing one or more flows of data, for example, between a browser rending the webpage and a server serving the webpage to the browser, or between the browser and one or more remote systems (e.g., remote computing entities that one or more scripts loading on the webpage attempt to communicate with). For instance, one or more response headers may be scanned to identify a source or initiator of the particular tracking tool such as, for example, one or more response headers that have been sent to the browser by a host server associated with the particular tracking tool in response to the host server receiving an HTTP request. Here, the response header may include, for example, a date, size, and/or type of file that the host server is attempting to send to the browser, as well as, or instead of, other data such as data about the host server itself. Accordingly, the tracking tool identification process 100 may involve using this header information to match a source script with the particular tracking tool or otherwise determine a source script for the particular tracking tool.

Alternatively, or in addition, in other embodiments, the tracking tool identification process 100 may involve employing a back-end synch with tags to identify a source for a particular tracking tool. In such an embodiment, a host identifier may be initially determined from the host field associated with a source script that may be associated with the particular tracking tool. The host identifier for the source script may then be matched to a host of a known tracking tool (e.g., as determined from a data source of known tracking tools) to determine that the particular source script is associated with the same host and, therefore, the associated particular tracking tool may be assumed to have a similar tracking purpose.

Accordingly, in particular embodiments, the tracking tool identification process 100 continues with generating an output file for the identified tracking tools at Step 115. Here, the output file may include an identifier for each tracking tool along with other information for the tools such as, for example, an identifier for an associated source script and/or other information acquired from the response header. Thus, the output file may associate an identified tracking tool with a respective source script that is used to execute, load, introduce, etc. the tracking tool along with other associated data.

The tracking tool identification process 100 continues with selecting an identified tracking tool at Step 120 and evaluating the tracking tool at Step 125. Accordingly, in various embodiments, the evaluation of the selected tracking tool is performed via an evaluate tracking tool process described in FIG. 2. As detailed further herein, the evaluate tracking tool process involves evaluating one or more parameters for the tracking tool to identify one or more categories associated with the tracking tool, as well as one or more locations associated with the tracking. As discussed further herein, the one or more categories and/or locations can then be used in various embodiments in determining whether to have the tracking tool be loaded and executed in a normal fashion during a user's visit to the website when the webpage is rendered, prohibit the tracking tool from loading and executing at all, or allow the tracking tool to load and execute but with limited capabilities and/or functionality.

The tracking tool identification process 100 continues with determining whether another tracking tool has been identified at Step 130. If so, then the tracking tool identification process 100 returns to Step 120, selecting the next identified tracking tool, and evaluating the newly selected tracking tool as just described. Otherwise, the tracking tool identification process 100 advances to Step 135, generating and/or populating a data set indicating the identified tracking tools (and/or their respective source scripts) and the respective one or more categories and one or more identified locations for each tracking tool. Accordingly, in various embodiments, this data set may be stored in an output file of any suitable format, such as a JavaScript® Object Notation (JSON) formatted file that can then be embedded into a webpage or code (e.g., JavaScript®) associated with the webpage or website. As detailed further herein, the information on the identified tracking tools can then be used as in various embodiments in controlling which and/or how the different identified tracking tools are loaded and/or executed when the associated webpage is rendered for a particular user who is visiting the website.

Although not shown in FIG. 1, the tracking tool identification process 100 (or some other process) may involve generating computer-executable instructions (e.g., code) that make use of the output file to control the implementation of the one or more tracking tools for the webpage at times when a request has been received to load (render) the webpage as a result of a user visiting the website. For example, in particular embodiments, the computer-executable instructions may be configured as a script that is run as a first script (e.g., JavaScript®) on a webpage when the webpage is rendered by a browser.

Evaluate Tracking Tool

Figure 2:
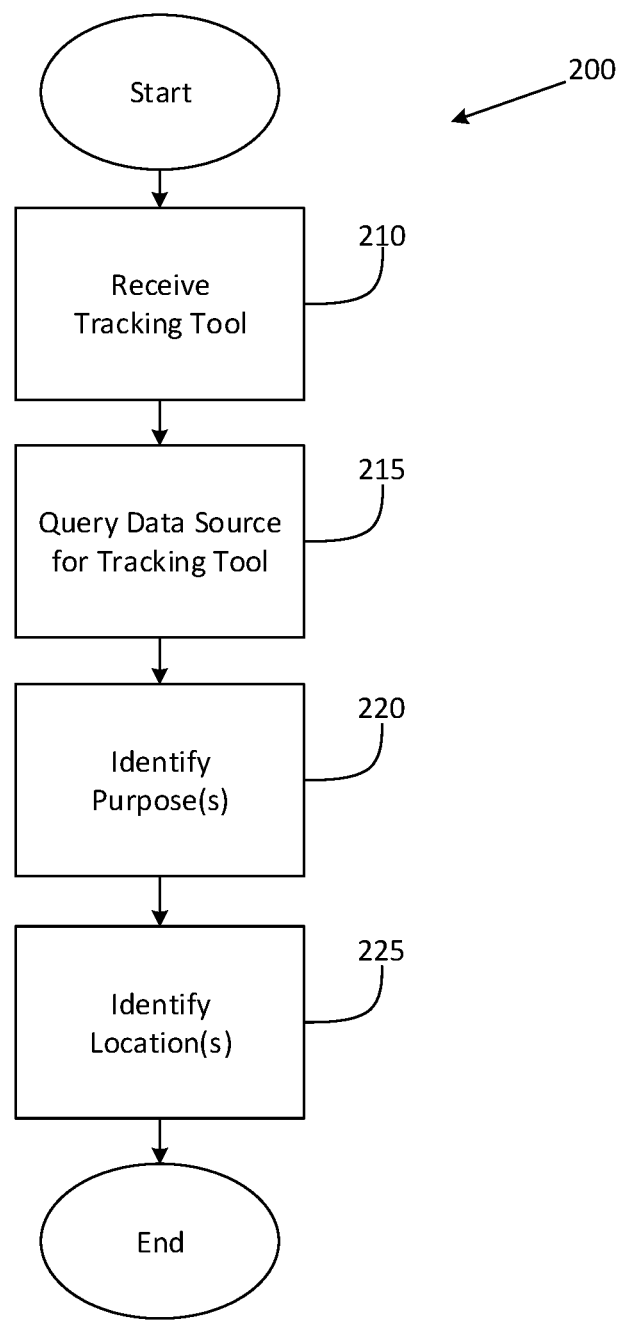
FIG. 2 is a flowchart of a process for evaluating a tracking tool in accordance with various embodiments of the present disclosure.

Turning now to FIG. 2, additional details are provided regarding an evaluate tracking tool process for evaluating a tracking tool in accordance with various embodiments of the disclosure. Accordingly, the process 200 may be implemented in various embodiments as suitable program code executed on computing hardware such as, for example a server as described herein.

The evaluate tracking tool process 200 begins with receiving the identified tracking tool for the webpage at Step 210. Depending on the embodiment, the identified tracking tool may be received as input and/or accessed from a data source such as the output file described above. Accordingly, various information may be received for the identified tracking tool such as, for example, an identifier for the tracking tool, identifier for a source script associated with the tracking, and/or other related information that may have been included in the output file produced by the tracking tool identification module as described above.

The evaluate tracking tool process 200 continues with comparing the identified tracking tool to known tracking tools at Step 215. In various embodiments, this particular step is performed by accessing a data source (e.g., database, one or more files, and/or the like) that includes information on known tracking tools. For example, the data source may store information for each known tracking tool that may include, but is not limited to: (1) one or more vendors that are associated with the known tracking tool; (2) one or more purposes of the known tracking tool; (3) one or more types of personal data that the known tracking tool may collect and/or process; (4) one or more host identifiers associated with the known tracking tool; and/or (5) any other attributes and/or characteristics of the known tracking tool. Accordingly, the evaluate tracking tool process 200 may involve determining which one or more of the known tracking tools most closely matches with the identified tracking tool based at least in part on the comparison. For example, a purpose of a tracking tool may be to gather information on the products viewed by a user while he or she is visiting an e-commerce website. Thus, depending on the embodiment, information known for the identified tracking tool may be used in conducting the comparison to known tracking tools. For instance, an identifier for the tracking tool (e.g., name of the tracking tool), vendor of the tracking tool, source providing the tracking tool, and/or the like may be used in identifying one or more known tracking tools associated with the identified tracking tool.

The evaluate tracking tool process 200 continues with identifying one or more categories for the identified tracking tool at Step 220. Here, in particular embodiments, the one or more categories may be identified based at least in part on one or more purposes associated with the identified tracking tool as gathered from the known tracking tool(s) associated with the identified tracking tool. For instance, in some embodiments, information gathered for the identified tracking tool from the response header and provided in the output file may be used, in combination with information found in the data source for the known tracking tool(s) associated with the identified tracking tool, to determine one or more categories for the tracking tool.

For example, if information gathered on the particular tracking tool indicates a purpose for the particular tracking tool matches a purpose of a known tracking tool that facilitates the collection of web browsing information, then the evaluate tracking tool process 200 may involve associating the category "web browsing information collection" with the particular tracking tool. In another example, if information gathered on the particular tracking tool indicates that the types of personal data collected by the particular tracking tool matches the types of personal data collected by a known tracking tool, then the evaluate tracking tool process 200 may involve associating a category associated with the types of personal data collected with the particular tracking tool. In yet another illustrative example, if the information gathered on the particular tracking tool indicates that a particular host server is associated with the particular tracking tool and the particular host server matches a host server associated with a known tracking tool, then the evaluate tracking tool process 200 may involve associating the category of the known tracking tool with the particular tracking tool. In yet another illustrative example, if information gathered for the particular tracking tool indicates that a particular vendor is associated with the particular tracking tool and that the vendor matches a vendor associated with a known tracking tool, then the evaluate tracking tool process 200 may involve associating the category of the known tracking tool with the particular tracking tool. Accordingly, depending on the embodiment, the evaluate tracking tool process 200 may be performed to use various other particular attributes of tracking tools and/or related information, and/or any combinations thereof, to determine one or more categories for the particular tracking tool.

Continuing, in various embodiments, the evaluate tracking tool process 200 involves using information (e.g., found in the data source) for the associated known tracking tool(s) to identify one or more data destination locations for the identified tracking tool at Step 225. For instance, the one or more data destination locations may be associated with locations to which the identified tracking tool transfers data or at which a computing entity such as a server is located that calls, loads, executes, etc. the identified tracking tool. In some embodiments, the evaluate tracking tool process 200 may also, or instead, involve analyzing the identified tracking tool and/or any source script that is used to execute, load, introduce, etc. the tracking tool to determine one or more data destination locations of one or more computing entities that call, load, execute, etc. the identified tracking tool. Alternatively, or in addition, the evaluate tracking tool process 200 may involve analyzing the identified tracking tool and/or any respective script used to execute and/or introduce the identified tracking tool to determine one or more data destination locations for data collected by the tracking tool and transmitted to a computing entity at such data destination locations.

For example, in particular embodiments, the identified tracking tool and/or associated source script may be analyzed to determine a network address (e.g., IP address) of a server associated with calling or loading the tracking tool and/or source script. A reverse network address look-up (e.g., reverse IP address look-up) may then be performed to determine a geographical or jurisdictional location to associate with the particular tracking tool and/or source script. Alternatively, or in addition, a tracking tool and/or source script may be analyzed to determine a network address (e.g., IP address) associated with a remote device to which the tracking tool and/or source script is configured to transmit data. A reverse network address look-up (e.g., reverse IP address look-up) may then be used to determine a geographical or jurisdictional destination location to associate with the particular tracking tool and/or source script.

In some embodiments, the evaluate tracking tool process 200 may involve tagging the identified tracking tool by storing one or more parameters (e.g., as metadata) associated with the particular tracking tool that indicate that a particular data destination location has been identified as being associated with the tool. Alternatively, or in addition, the evaluate tracking tool process 200 may involve determining that a data destination location, which has been identified as being associated with the particular tracking tool, is a particular type or category of location (e.g., outside the EU, within the EU, subject to a particular regulatory framework, not subject to a particular regulatory framework, etc.) and tagging the particular tracking tool by storing one or more parameters (e.g., as metadata) associated with the tool that indicate that the particular data destination location is of the determined location type or in the determined location category.

As previously noted, in various embodiments, the one or more categories and/or one or more data destination locations identified for the particular tracking tool may then be recorded in a data set. As furthered noted, the one or more categories and/or data destination locations may then be used in controlling which different identified tracking tools are loaded and/or executed when the associated webpage is rendered for a particular user who is visiting the website (and/or how the tracking tools are loaded and/or executed).

Tracking Tool Implementation

Figure 3:
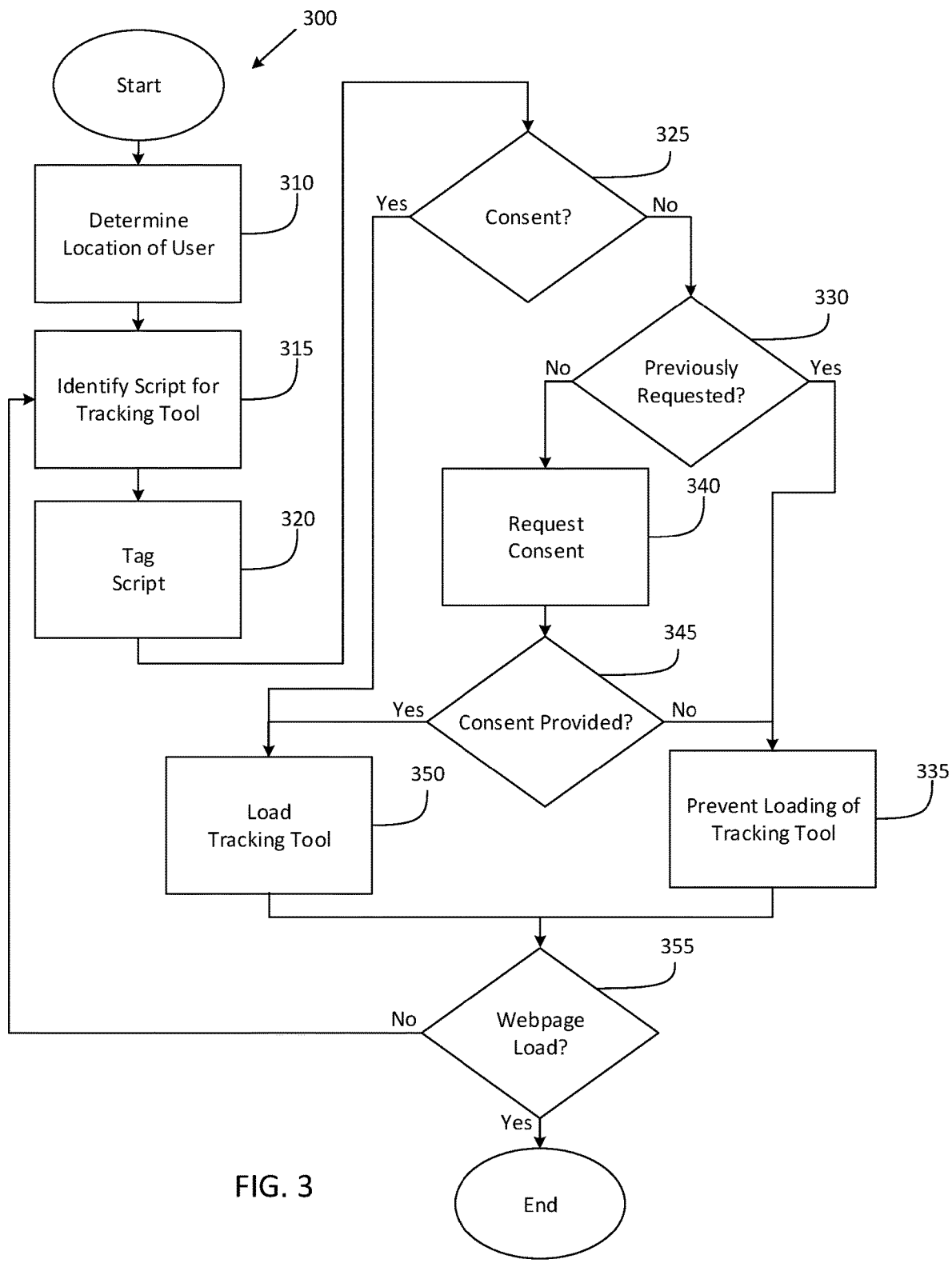
FIG. 3 is a flowchart of a process for implementing one or more tracking tools in accordance with various embodiments of the present disclosure.

Turning now to FIG. 3, additional details are provided regarding a tracking tool implementation process 300 for implementing one or more tracking tools in accordance with various embodiments of the disclosure. In particular embodiments, the tracking tool implementation process 300 may be implemented as a first script (e.g., JavaScript®) to run on a webpage when the webpage is rendered by a browser (e.g., a webpage previously analyzed as described herein). The script may be configured to include the data set described above with respect to the tracking tool identification process 100. For example, the script may include the data set as an embedded JavaScript® Object Notation (JSON) formatted file that may include all of the identified tracking tools, source scripts, tags, and/or data destination location and categorization information discussed above. As discussed further herein, the script may use the embedded JSON formatted file to map the data destination locations associated with the various tracking tools associated with the webpage. In addition, the script may use the embedded JSON formatted file to map one or more locations associated with a user, as well as use the JSON formatted file to map permitted data destination locations and/or prohibited data destination locations to location(s) associated with the user. In other embodiments, the script may use alternative means to perform any one or more of these functions. To enhance performance, the script in various embodiments may have its own Content Delivery Network endpoint.

Accordingly, a user visits the website and sends a request to render a webpage for the website. That is to say, in particular embodiments, a browser executing on a computing entity being used by the user sends an http request to render the webpage that is received by a computing entity such as a web server. In turn, the web server prepares and sends an http response to the request back to the browser and, as a result, the tracking tool implementation process 300 is executed via the webpage being loaded in the user's browser residing on the user's computing entity. Thus, the tracking tool implementation process 300 may be implemented in various embodiments as suitable program code (e.g., a script) executed on computing hardware such as, for example, a client computing device as described herein.

Therefore, in various embodiments, the tracking tool implementation process 300 begins with determining one or more locations (e.g., jurisdictions) for the user visiting the website at Step 310. Depending on the embodiment, the tracking tool implementation process 300 may involve determining the location(s) for the user by analyzing user information and using one, or a combination of, various techniques, such as a user geographical location, a user network address (e.g., IP Address), a reverse network address look-up of a user network address (e.g., a reverse IP address look-up), browser information, user language (e.g., the language selected by the user in using the website), user data collected and/or determined as part of obtaining consent from the user, and/or the like. In addition, in some embodiments, the tracking tool implementation process 300 may involve tagging the user (e.g., using metadata) as being located in the location(s), and/or otherwise store the location(s), in response to determining the user is associated with one or more particular locations such as the EU.

For example, the user may be a resident of the EU who is currently visiting the United States. Therefore, in this example, the tracking tool implementation process 300 may involve determining that a first location associated with the user is the United States based at least in part on a current IP address for the user. However, in addition to the first location, the tracking tool implementation process 300 may involve determining that a second location associated with the user is the EU based at least in part on a language (e.g., French) selected by the user in which to have the webpages of the website rendered. Therefore, in this particular example, the tracking tool implementation process may involve taking both locations into consideration in evaluating whether to block certain tracking tools.

It is noted that the tags on the location(s) that has been identified for the user (e.g., metadata) are used in particular embodiments in restricting particular uses of personal data collected for the user. For instance, metadata on the location(s) identified for the user may be stored along with personal data collected for the user that can then be used to restrict the user's personal data from being processed by and/or transferred to any system outside of the user's jurisdiction. For example, such metadata associated with a user's email address may be used to restrict the user's e-mail address from being transferred outside of the European Union, such as being propagated to US-based (e.g., or other country) marketing systems.

The tracking tool implementation process 300 continues with analyzing the source scripts that are attempting to execute as the webpage is being loaded and determines that a particular script is associated with a tracking tool at Step 315. Here, in particular embodiments, the tracking tool implementation process 300 may involve referencing the data set (e.g., the JSON formatted file) to identify a script that is attempting to execute and that is associated with a tracking tool of interest. Accordingly, in various embodiments, the tracking tool implementation process involves tagging the script with a category based at least in part on the tracking tool information found in the data set for the tracking tool at Step 320.

In particular embodiments, a category associated with the tracking tool may not be determined based on the information provided in the output file. In such cases, the tracking tool implementation process 300 may involve automatically disabling the source script for the tracking tool so that the tracking tool is not executed. Alternatively, the tracking tool implementation process 300 may involve allowing the source script to run. Accordingly, in some embodiments, this setting of whether to run scripts for which there is insufficient information may be a user-configurable setting or preconfigured by a system operator.

In addition, in particular embodiments, the information provided in the output file may indicate whether the tracking tool is authorized or not authorized to run. Here, for example, the tracking tool implementation process 300 may involve matching the script that is attempting to execute with a source script for a tracking tool in the data set that indicates that the tracking tool is not authorized to execute (or does not match a source script for a tracking tool that is explicitly indicated in the data set as authorized to execute). In response, the tracking tool implementation process 300 may involve preventing that script from executing. Similarly, the tracking tool implementation process 300 may involve determining that the particular script that is attempting to execute matches a source script that is indicated in the data set as a tracking tool that is authorized to execute (or does not match a source script for a tracking tool that is explicitly indicated in the data set as being prohibited from executing) and in response, allowing that script to execute.

The tracking tool implementation process 300 continues with determining whether consent has been provided by the user for the particular tracking tool, itself, and/or for the category associated with the tracking tool at Step 325. In various embodiments, the tracking tool implementation process 300 may involve accessing a user consent data source (e.g., database file, matrix, vector, and/or the like) and based at least in part on the category tagged to the tracking tool, determining whether the user visiting the website had previously granted consent to process his or her personal data within the specific category. For example, the user may have previously provided consent (e.g., opted in) to having information on his or her browsing history on the website recorded. As a result, the entity running the web site may have recorded the user's consent at that time so that such consent is reflected in the user consent data source.

If consent has not been provided by the user, then the tracking tool implementation process 300 in various embodiments involves determining whether consent had been previously requested from the user at Step 330. For example, in particular instances, the user consent data source may indicate that the user had expressly declined (e.g., opted out of) consent for the category of the tracking tool during a past visit. However, in other instances, the user may have passively declined consent by not expressly providing or declining consent. For example, the user may have visited the website in the past and been provided with an option to "opt in" or "opt out" for the category and not selected either option.

Therefore, if the user has expressly declined consent or consent was previously requested but the user did not decline or provide consent, then the tracking tool implementation process 300 in various embodiment involves preventing the script from executing to facilitate loading of the tracking tool at Step 335. However, if consent has not been previously requested, then the tracking tool implementation process 300 involves requesting the user's consent for the category of the tracking tool (and/or the particular tracking tool itself) at Step 340. Accordingly, in various embodiments, the tracking tool implementation process may involve prompting the user for consent to load the tracking tool associated with the specific category. For instance, in particular embodiments, the user may be presented with a consent notice requesting permission to process data for the specific category.

The tracking tool implementation process 300 continues with receiving an indication of consent and determines whether the user has provided consent for the tracking tool (category of tracking tool) at Step 345. Accordingly, in some embodiments, the tracking tool implementation process 300 may involve recording/storing the indication of consent (e.g., permitted or declined) for the user in the user consent data source. If the user has not provided consent, then the tracking tool implementation process 300 involves preventing the script from executing to facilitate loading of the tracking tool at Step 335. However, if the user has provided consent for the tracking tool (category of tracking tool), then the tracking tool is loaded at Step 350.

Figure 4:
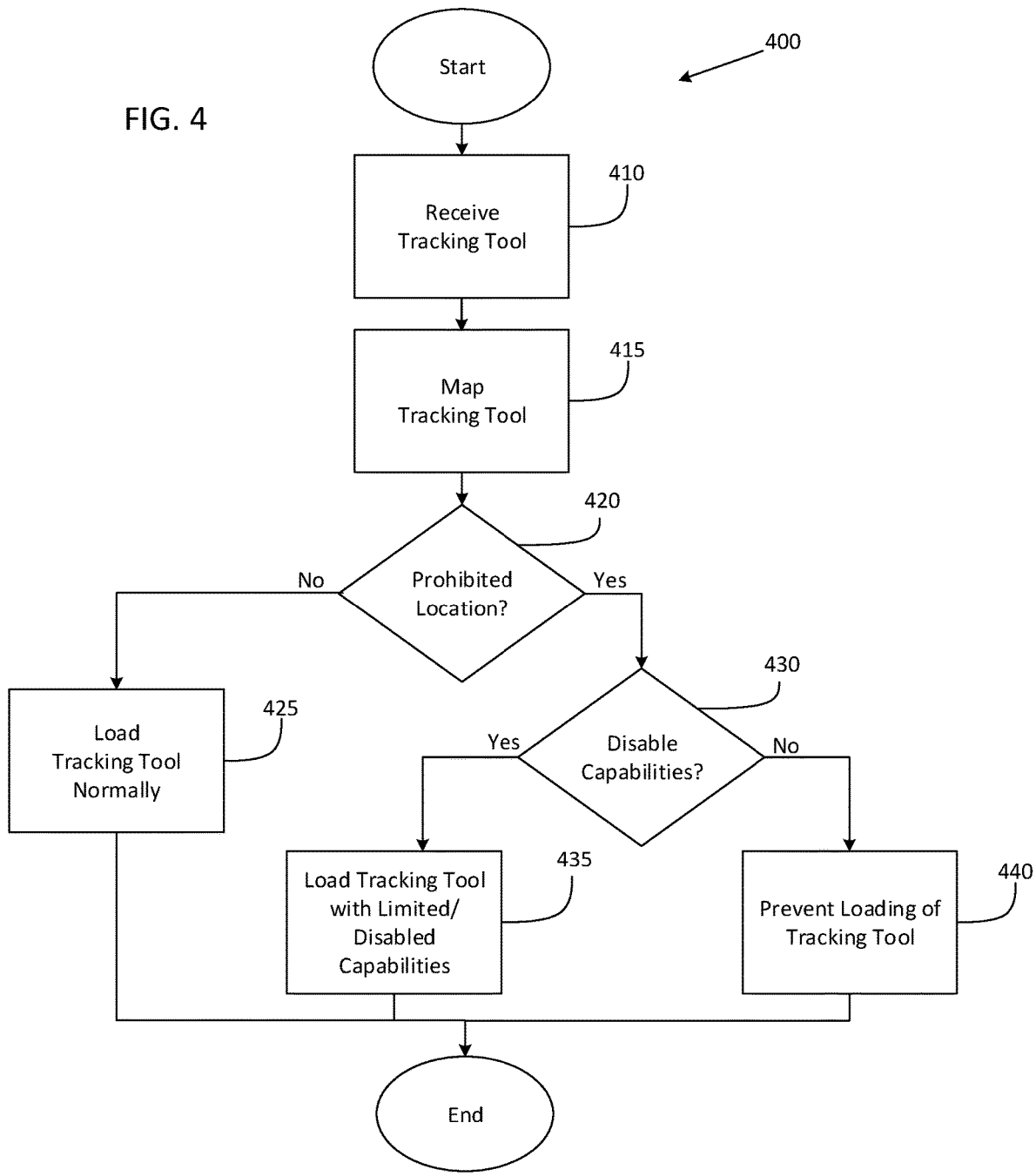
FIG. 4 is a flowchart of a process for loading a tracking tool in accordance with various embodiments of the present disclosure.

In various embodiments, the tracking tool is loaded via a load tracking tool process as described in FIG. 4. Accordingly, the load tracking tool process involves allowing the script to execute to load the tracking tool to execute normally, preventing the script from executing and the tracking tool from loading and executing entirely, or allowing the script to execute to load the tracking tool but with certain capabilities and/or functionality disabled from executing. As discussed further herein, the load tracking tool process involves determining how to implement the particular tracking tool in particular embodiments based at least in part on an evaluation of the tracking tool with respect to the data destination location(s) associated with the tracking tool and/or location(s) associated with the user. Therefore, in these embodiments, the load tracking tool process can enable the entity to operate the website in a manner that is in compliance with any regulations and/or restrictions associated with the processing of personal data of the user that may be performed by the tracking tool.

At this point, the tracking tool implementation process 300 continues determining whether the webpage has loaded at Step 355. If not, then the tracking tool implementation process 300 involves returning to Step 315 and analyzing any additional scripts as they attempt to execute on the webpage.

At this point, a particular tracking tool identified for a particular webpage may: (1) function normally while the user is viewing and/or interacting with the webpage; (2) not function at all, thus eliminating the collection and use of any personal data for the user associated with the tracking tool; or (3) function with limited capabilities and/or functionality, thus minimizing and/or eliminating the collection and use of any personal data for the user associated with the tracking tool. Therefore, the tracking tool implementation process 300 may allow for the entity to operate the website and corresponding webpage(s) for the website and facilitate the processing (e.g., collecting, storing, transferring, and/or the like) of personal data of users who visit the website while remaining in conformance with any regulatory restrictions that may be in place on the processing of the personal data based at least in part on consent provided by the users, as well as the data destination location(s) associated with the processing of the personal data and/or the locations associated with the users.

In addition, in particular embodiments, the tracking tool implementation process 300 may involve evaluating tracking tools (and/or the process may be invoked) at different times during the user's visit of the website. For example, the tracking tool implementation process 300 may be performed at a time after the webpage has been loaded (rendered) to evaluate tracking tools (or may be invoked) in response to particular information being received from the user as the user interacts with the webpage, even though such information may have not been received at a time when the webpage was being loaded. Accordingly, in these embodiments, the tracking tool implementation process 300 may be performed to disable a tracking tool that has been loaded based at least in part on the information that has been received by the user. For instance, the tracking tool may involve a cookie that has been installed on the user's computing entity and the tracking tool implementation process 300 may be performed to remove the cookie.

For example, as the user interacts with the website, the user may provide information that may identify a location for the user. For instance, the user may provide a shipping address for a purchase the user is making through the website that indicates the user resides in the EU. As a result of this new information, the tracking tool implementation process 300 may be performed in some embodiments to determine that an additional location for the user is the EU and in response, conduct an analysis on any tracking tools being used for the current webpage being viewed by the user based at least in part on the additional location. Accordingly, the tracking tool implementation process 300 may be performed to remove a particular tracking tool that was initially loaded in response to the tracking tool involving the processing of personal data outside the EU. Thus, in particular embodiments, the tracking tool implementation process 300 may allow for the entity to adjust operation of the website and corresponding webpage(s) for the website during a user's visit of the website to ensure conformance with any regulatory restrictions.

Load Tracking Tool

Turning now to FIG. 4, additional details are provided regarding a load tracking tool process 400 for loading a tracking tool in accordance with various embodiments of the disclosure. In various embodiments, similar to the tracking tool implementation process 300, the load tracking tool process may be implemented as a script (e.g., JavaScript®) to run on the webpage when the webpage is rendered by a browser (e.g., a webpage previously analyzed as described herein). Thus, the load tracking tool process 400 may be implemented in various embodiments as suitable program code (e.g., a script) executed on computing hardware such as, for example, a client computing device as described herein.

The load tracking tool process 400 begins with receiving the tracking tool at Step 410. Here, in particular embodiments, the tracking tool is received via one or more pieces of information on the tracking tool such as, for example, an identifier for the source script that is attempting to execute the tracking tool and/or an identifier for the tracking tool itself.

The load tracking tool process 400 continues with mapping whether each data destination location associated with the tracking tool is a permitted or prohibited data destination location (e.g., jurisdiction) with respect to the location(s) associated with the user at Step 415. Here, in particular embodiments, the load tracking tool process 400 may involve using information associated with the identified tracking tool in the output file (e.g., the JSON formatted file) to identify the data destination locations associated with the tracking tool. Accordingly, the information may be accessed using the identifier for the source script and/or tracking tool. In addition, the load tracking tool process 400 may involve identifying the location(s) associated with the particular user (e.g., provided as input or accessed via metadata for the user). In various embodiments, the load tracking tool process 400 involves performing the mapping, and determining whether any of the data destination location(s) associated with the tracking tool is considered (e.g., matches) a prohibited data destination location for any of the location(s) associated with the particular user. For instance, in particular embodiments, the load tracking tool process 400 may involve determining one or more prohibited (and/or permitted) data destination locations based at least in part on the location(s) associated with the particular user using a data structure that maps the location(s) associated with the user with or one or more listings of prohibited data destination locations and/or one or more listings of permitted data destination locations. Accordingly, the load tracking tool process 400 may involve determining whether a data destination location associated with the tracking tool is identified in any of the one or more listings.

In some embodiments, the load tracking tool process 400 may involve performing a comparison of indicators based at least in part on the one or more locations associated with the user and one or more data destination locations associated with the tracking tool to determine whether the particular tracking tool should be blocked (e.g., prohibited from executing) or limited for the user. For example, a "non-EU" indicator may have been stored in the output file for the particular tracking tool that indicates that the tool transfers data to a location outside the EU. In addition, an "EU" indicator may have been stored in metadata for the particular user indicating the user is an EU citizen. Here, the load tracking tool process 400 may involve making use of the listings mentioned above in determining whether the "non-EU" indicator associated with the tracking tool (e.g., in light of the "EU" indicator for the user) is a prohibited location.

Thus, in various embodiments, the load tracking tool process 400 involves determining whether the tracking tool is associated with a prohibited data destination location at Step 420. If none of the data destination locations associated with the particular tracking tool maps to a prohibited data destination location for the particular user, then the load tracking tool process 400 continues with allowing the source script for the tracking tool to execute and load the tracking tool normally at Step 425. As a result, the tracking tool is permitted to execute normally.

However, if the load tracking tool module determines that a data destination location associated with the particular tracking tool maps to a prohibited data destination location (or that at least one data destination location does not map to a permitted data destination location) for the particular user, then the load tracking tool process 400 involves prohibiting the tracking tool from executing normally. Accordingly, in particular embodiments, this particular step involves prohibiting (blocking) the source script associated with the tracking tool from executing, thus preventing the tracking tool from loading. However, alternatively, or in addition, in some embodiments, this particular step involves preventing the implementation of one or more capabilities and/or functionality of the particular tracking tool to limit and/or prohibit (not permit) processing of personal data involving prohibited data destination locations instead of entirely blocking the operation of the particular tracking tool. For example, the tracking tool may be allowed to operate but prevent the tool from tracking particular types of personal data and/or transferring personal data to particular data destination locations (e.g., jurisdictions).

Therefore, in various embodiments, the load tracking tool process 400 involves determining whether capabilities and/or functionality for the tracking tool should be limited and/or prohibited or whether the tracking tool module should be prohibited from executing entirely at Step 430. For example, the tracking tool may be configured to collect one or more pieces of data while the user is interacting with the webpage. A first piece of data may be information on various navigation functionality (e.g., buttons, dropdowns, slide bars, and/or the like) that the user makes use of while navigating around the webpage. A second piece of data may be a specific identifier of the user (e.g., a username and/or an account number) that indicates the user's identity. Thus, the second piece of data may be considered a piece of personal data for the user. Accordingly, in this example, a determination may be made as to whether the tracking tool should be entirely prohibited from operating or that certain capabilities and/or functionality should be prohibited based at least in part on information found in the output file for the tracking tool that identifies that the purpose of the tracking tool is to collect information on the navigation functionality used by the user, as well as an identifier for the user. Therefore, the load tracking tool process 400 may result in determining that the functionality of the tracking tool should be limited so that only the information on the navigation functionality is collected and not the identifier for the user.

Accordingly, the load tracking tool process 400 may involve loading the tracking tool accordingly at Step 435. Therefore, in the example, the script may be allowed to load the tracking tool but with particular capability and/or functionality disabled in the tracking tool that is used for collecting (e.g., recording) an identifier for the user. If instead the load tracking tool process 400 involves determining that the tracking tool should be prohibited from executing entirely, then the tracking tool is prohibited from loading at Step 440. Therefore, in various embodiments, the source script used for loading the tracking tool would be prohibited from executing.

It is noted that various embodiments of the disclosure are configured so that if a location associated with a tracking tool is prohibited or not permitted, the tracking tool may still be prohibited (e.g., blocked) from running or may be restricted with respect to one or more capabilities and/or functionality, even if the user has provided consent. That is to say, particular embodiments of the disclosure are configured to provide a mechanism to ensure compliance with any regulations and/or restrictions that may be in place for the processing of personal data, even in instances when the user may consent to such processing of his or her personal data. However, other embodiments of the disclosure may be configured to allow a user's consent to override a prohibited location associated with a tracking tool and allow the tracking tool to run normally. Further, it is noted that various embodiments of the disclosure may be used for any suitable type of element including scripts, images (e.g., beacons), iframe tags, etc.

Example Technical Platforms

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

Depending on the embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

Depending on the embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Example System Architecture

Figure 5:
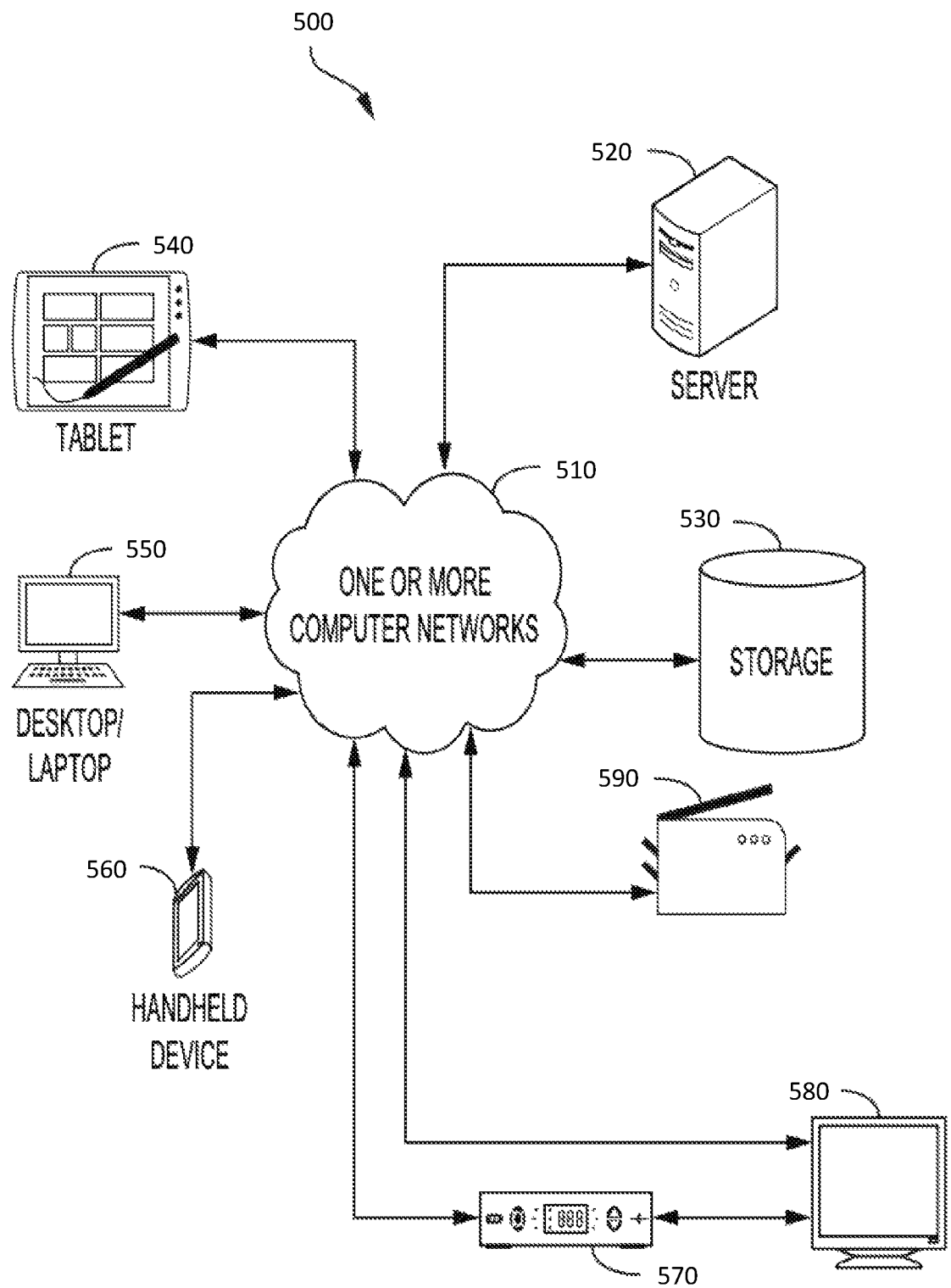
FIG. 5 is a block diagram illustrating an exemplary system architecture that may be used in accordance with various embodiments of the present disclosure.

FIG. 5 is a block diagram of a system architecture 500 that may be used in accordance with various embodiments of the disclosure. As may be understood from this figure, the system architecture 500 may include one or more computer networks 510, one or more servers 520, one or more storage devices 530 (that may contain, for example, one or more databases of information), and/or one or more client computing devices such as one or more tablet computers 540, one or more desktop or laptop computers 550, one or more handheld computing devices 560 such as one or more smart phones, one or more browser and Internet capable set-top boxes 570 connected with TVs 580, smart TVs 580 having browser and Internet capability, and/or the like. In particular instances, the client computing device(s) attached to the network(s) 510 may also include devices such as scanners, copiers, printers, fax machines, and/or the like 590 having hard drives (a security risk since copies/prints may be stored on these hard drives). The one or more servers 520, client computing devices, and/or storage devices 530 may be physically located in a same (e.g., central) location, such as the headquarters of an organization, for example, or in separate locations.

Accordingly, the one or more servers 520 may be configured for performing different functionality within the system. For example, one or more of the servers 520 may be configured as web server(s) that provide functionality with respect to receiving http requests and providing content in the form of web pages for one or more websites visited by the various client computing devices. In addition, one or more of the servers 520 may be configured for performing different functionality such as backend services with respect to the one or more websites. In particular embodiments, such one or more servers 520 may be configured to perform the evaluate tracking tool process 200 as previously described.

Further, in particular embodiments, the tracking tool implementation process 300 and load tracking tool process 400 previously described may be performed by one or more client computing devices.

In various embodiments, the one or more computer networks 510 facilitate communication between the one or more servers 520, client computing devices, and/or storage devices 530. Here, the one or more computer networks 510 may include any of a variety of types of wired or wireless computer networks such as the Internet, a private intranet, a public switched telephone network (PSTN), or any other type of network. Accordingly, the communication link between the one or more servers 520, client computing devices, and/or storage devices 530 may be, for example, implemented via a Local Area Network (LAN), a Wide Area Network (WAN), the Internet, and/or the like.

Example Computing Entity

Figure 6:
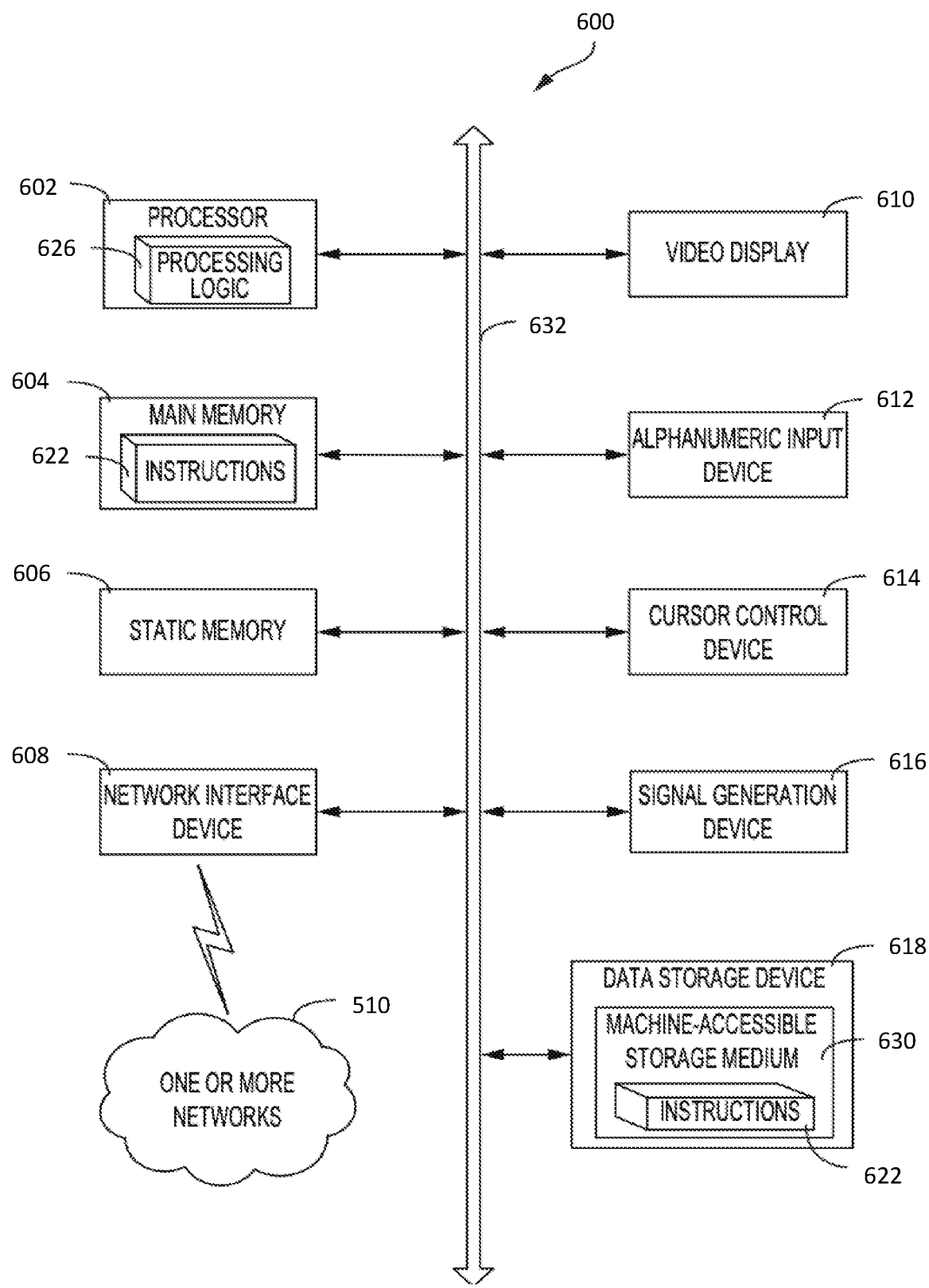
FIG. 6 is a schematic diagram of a computing entity that may be used in accordance.

FIG. 6 illustrates a diagrammatic representation of a computing entity 600 that may be used in accordance with various embodiments of the disclosure. For example, the computing entity 600 may be computing hardware such as a server 520 and/or a client computing device as described in FIG. 5. In particular embodiments, the computing entity 600 may be connected (e.g., networked) to one or more other computing entities, storage devices, and/or the like via one or more networks such as, for example, a LAN, an intranet, an extranet, and/or the Internet. As noted above, the computing entity 600 may operate in the capacity of a server and/or a client device in a client-server network environment, or as a peer computing device in a peer-to-peer (or distributed) network environment. Accordingly, depending on the embodiment, the computing entity 600 may be a personal computer (PC), a tablet PC, a set-top box (STB), a Personal Digital Assistant (PDA), a mobile device (smart phone), a web appliance, a server, a network router, a switch or bridge, or any other device capable of executing a set of instructions (sequential or otherwise) that specify actions to be taken by that device. Further, while only a single computing entity 600 is illustrated, the term "computing entity" shall also be taken to include any collection of computing entities that individually or jointly execute a set (or multiple sets) of instructions to perform any one or more of the methodologies discussed herein.

An exemplary computing entity 600 includes a processor 602, a main memory 604 (e.g., read-only memory (ROM), flash memory, dynamic random access memory (DRAM) such as synchronous DRAM (SDRAM), Rambus DRAM (RDRAM), and/or the like), a static memory 606 (e.g., flash memory, static random access memory (SRAM), and/or the like), and a data storage device 618, that communicate with each other via a bus 632.

The processor 602 may represent one or more general-purpose processing devices such as a microprocessor, a central processing unit, and/or the like. In some embodiments, the processor 602 may be a complex instruction set computing (CISC) microprocessor, reduced instruction set computing (RISC) microprocessor, very long instruction word (VLIW) microprocessor, processor implementing other instruction sets, processors implementing a combination of instruction sets, and/or the like. In some embodiments, the processor 602 may be one or more special-purpose processing devices such as an application specific integrated circuit (ASIC), a field programmable gate array (FPGA), a digital signal processor (DSP), network processor, and/or the like. The processor 602 may be configured to execute processing logic 626 for performing various operations and/or steps described herein.

The computing entity 600 may further include a network interface device 608, as well as a video display unit 610 (e.g., a liquid crystal display (LCD), a cathode ray tube (CRT), and/or the like), an alphanumeric input device 612 (e.g., a keyboard), a cursor control device 614 (e.g., a mouse), and/or a signal generation device 616 (e.g., a speaker). The computing entity 600 may further include a data storage device 618. The data storage device 618 may include a non-transitory computer-readable storage medium 630 (also known as a non-transitory computer-readable storage medium or a non-transitory computer-readable medium) on which is stored one or more sets of instructions 622 (e.g., software, software modules) embodying any one or more of the methodologies or functions described herein. The instructions 622 may also reside, completely or at least partially, within main memory 604 and/or within the processor 602 during execution thereof by the computing entity 600—main memory 604 and processor 602 also constituting computer-accessible storage media. The instructions 622 may further be transmitted or received over a network 510 via the network interface device 608.

While the computer-readable storage medium 630 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the computing entity 600 and that causes the computing entity 600 to perform any one or more of the methodologies of the present disclosure. The term "computer-readable storage medium" should accordingly be understood to include, but not be limited to, solid-state memories, optical and magnetic media, and/or the like.

Exemplary System Operation

The logical steps and/or operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical steps and/or operations described herein are referred to variously as states, operations, steps, structural devices, acts, or modules. These operations, steps, structural devices, acts, and modules may be implemented in software code, in firmware, in special purpose digital logic, and any combination thereof. Greater or fewer steps and/or operations may be performed than shown in the figures and described herein. These steps and/or operations may also be performed in a different order than those described herein.

Conclusion

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the embodiments described above should not be understood as requiring such separation in all embodiments, and it should be understood that the described program components (e.g., modules) and systems may generally be integrated together in a single software product or packaged into multiple software products.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A method comprising:
   scanning, by computing hardware, a webpage to identify a tracking tool that is associated with the webpage;
   determining, by the computing hardware, a data destination location that is associated with the tracking tool, wherein the determining step is based on at least one of (a) a location for a computing device that invokes the tracking tool, (b) a location of a computing device that receives data via the tracking tool, or (c) a location of a computing device or a storage device that stores the data; and
   generating, by the computing hardware, program code, wherein the program code is configured to:
      determine a location associated with a user who is associated with a rendering of the webpage;
      determine a prohibited data destination location based on a data structure mapping the location associated with the user to the prohibited data destination location;
      determine that the data destination location associated with the tracking tool is the prohibited data destination location; and
      responsive to determining that the data destination location associated with the tracking tool is the prohibited data destination location, disabling functionality of the tracking tool configured for processing the data from executing without entirely disabling the tracking tool from executing.

2. The method of claim 1, wherein disabling the functionality of the tracking tool configured for processing the data from executing comprises preventing the tracking tool from transferring the data to the computing device that receives the data via the tracking tool.

3. The method of claim 1, wherein disabling the functionality of the tracking tool configured for processing the data from executing without entirely disabling the tracking tool from executing comprises:
    identifying a first request by the tracking tool to access a first type of data while the user is interacting with the webpage;
    identifying a second request by the tracking tool to access a second type of data while the user is interactive with the webpage;
    responsive to the first request, enabling the tracking tool to access the first type of data; and
    responsive to the second request, limiting the tracking tool from accessing the second type of data.

4. The method of claim 3, wherein the first type of data comprises user navigation data while the user is interacting with the webpage and the second type of data comprises user identification data associated with the user.

5. The method of claim 1, wherein the program code is configured to:
    prior to determining the location associated with the user, determine that the user has provided consent for the tracking tool; and
    responsive to determining that the user has provided consent for the tracking tool, enable the tracking tool to execute fully.

6. The method of claim 5, wherein the program code is configured to override the consent based on determining that the data destination location associated with the tracking tool is the prohibited data destination location.

7. The method of claim 1, wherein the program code is configured to determine the location associated with the user based on at least one of (a) a language associated with the user, (b) consent data associated with the user, or (c) data entered by the user on the webpage.

8. A non-transitory computer-readable medium having computer-executable instructions that are stored thereon, the computer-executable instructions executable by one or more processing devices for performing operations comprising:
    scanning a webpage to identify a tracking tool that is associated with the webpage;
    determining a data destination location that is associated with the tracking tool, wherein the data destination comprises at least one of a location for a computing device that invokes the tracking tool, a location of a computing device that receives data via the tracking tool, or a location of a computing device or a storage device that stores the data; and
    generating program code, wherein the program code is configured to:
        determine an initial location associated with a user who is associated with a rendering of the webpage;
        determine an initial tracking tool functionality level based on the initial location associated with the user and the data destination location associated with the tracking tool;
        permit the tracking tool to initially execute at the initial tracking tool functionality level;
        identify, while the user is interacting with the webpage, a second location associated with the user;
        determine a modified tracking tool functionality level based on the second location associated with the user and the data destination location associated with the tracking tool; and
        responsive to identifying the second location associated with the user, modify a functionality level of the tracking tool to the modified tracking tool functionality level.

9. The non-transitory computer-readable medium of claim 8, wherein:
    the initial tracking tool functionality level comprises at least one of full functionality or limited functionality in which at least one function of the tracking tool is disabled; and
    the modified tracking tool functionality level comprises at least one of the limited functionality in which the at least one function of the tracking tool is disabled or fully disabled functionality.

10. The non-transitory computer-readable medium of claim 8, wherein the initial tracking tool functionality comprises the fully disabled functionality.

11. The non-transitory computer-readable medium of claim 8, wherein the program code is configured to identify the second location associated with the user based on at least one of (a) a language associated with the user, (b) consent data associated with the user, or (c) data entered by the user on the webpage.

12. The non-transitory computer-readable medium of claim 11, wherein the program code is configured to determine the initial location associated with the user based on at least one of (a) a geographical location of the user, (b) a network address associated with the user, or (c) browser information on the user.

13. The non-transitory computer-readable medium of claim 8, wherein the program code is configured, prior to determining the initial location associated with the user to:
    determine that the user has not provided consent for the tracking tool; and
    responsive to determining the user has not provided the consent for the tracking tool, obtain the consent from the user.

14. The non-transitory computer-readable medium of claim 8, wherein determining the initial location associated with the user comprises determining that the initial location is indeterminable.

15. A method comprising:
    scanning, by computing hardware, a webpage to identify a tracking tool that is associated with the webpage;
    determining, by the computing hardware, a data destination location that is associated with the tracking tool, wherein the determining step is based on at least one of (a) a location for a computing device that invokes the tracking tool, (b) a location of a computing device that receives data via the tracking tool, or (c) a location of a computing device or a storage device that stores the data; and
    generating, by the computing hardware, program code, wherein the program code is configured to:
        determine a location associated with a user who is associated with a rendering of the webpage;
        determine a prohibited data destination location based on a data structure mapping the location associated with the user to the prohibited data destination location;
        determine that the data destination location associated with the tracking tool is the prohibited data destination location; and
        responsive to determining that the data destination location associated with the tracking tool is the prohibited data destination location, permitting the tracking tool to execute at a modified functionality level.

16. The method of claim 15, wherein the modified functionality level comprises at least one of disabling the tracking tool from executing or disabling functionality of the tracking tool configured for processing the data.

17. The method of claim 15, wherein the modified functionality level prevents the tracking tool from transferring the data to the computing device that receives the data via the tracking tool.

18. The method of claim 15, wherein the program code is further configured to:
    determine a second location associated with the user;
    determining a second modified functionality level based on the second location and the data destination location associated with the tracking tool; and
    responsive to determining the second location associated with the user, enabling the tracking tool to execute at the second modified functionality level.

19. The method of claim 15, wherein the modified functionality level involves:
    identifying a first request by the tracking tool to access a first type of data while the user is interacting with the webpage;
    identifying a second request by the tracking tool to access a second type of data while the user is interactive with the webpage;
    responsive to the first request, enabling the tracking tool to access the first type of data; and
    responsive to the second request, limiting the tracking tool from accessing the second type of data.

20. The method of claim 15, wherein the program code is configured to determine the location associated with the user based on at least one of (a) a geographical location of the user, (b) a network address associated with the user, (c) browser information on the user, (d) a language associated with the user, (e) consent data associated with the user, or (f) data entered by the user on the webpage.

* * * * *